United States Patent [19]

Murasaki et al.

[11] Patent Number: 5,441,687
[45] Date of Patent: Aug. 15, 1995

[54] METHOD AND APPARATUS FOR MANUFACTURING A MATERIAL-BACKED ENGAGING MEMBER FOR SURFACE FASTENER

[75] Inventors: Ryuichi Murasaki; Hissai Nishiyama, both of Toyama, Japan

[73] Assignee: Yoshida Kogyo K.K., Tokyo, Japan

[21] Appl. No.: 93,951

[22] Filed: Jul. 21, 1993

[30] Foreign Application Priority Data

Jul. 22, 1992 [JP] Japan .................. 4-195434

[51] Int. Cl.⁶ .................. B29C 47/02; B29C 47/32
[52] U.S. Cl. .................. 264/167; 264/171; 264/177.1; 425/113; 425/115; 425/380; 425/814
[58] Field of Search ........... 264/166, 167, 280, 284, 264/322, 171, 175, 177.1; 425/814, 380, 113, 115, 325, 327

[56] References Cited

U.S. PATENT DOCUMENTS

| | | | |
|---|---|---|---|
| 3,312,583 | 4/1967 | Rochlis. | |
| 3,445,915 | 5/1969 | Cuckson et al. | 425/814 |
| 3,462,332 | 8/1969 | Goto | 264/167 |
| 3,594,863 | 7/1971 | Erb. | |
| 3,594,865 | 7/1971 | Erb | 425/814 |
| 3,758,657 | 9/1973 | Menzin et al. | 264/167 |
| 3,956,056 | 5/1976 | Boguslawski et al. | 425/325 |
| 3,983,278 | 9/1976 | Wardle | 264/167 |
| 4,451,421 | 5/1984 | Jones et al. | 264/167 |
| 4,872,243 | 10/1989 | Fischer | 264/167 |

FOREIGN PATENT DOCUMENTS 1319511 6/1973 United Kingdom.
WO93/00215 1/1993 WIPO.

Primary Examiner—Mathieu D. Vargot
Attorney, Agent, or Firm—Hill, Steadman & Simpson

[57] ABSTRACT

A surface fastener engaging member manufacturing method includes: extruding from an extrusion nozzle a predetermined width of molten resin; introducing the molten resin into a predetermined gap between the extrusion nozzle and a die wheel to fill up coupling element molding cavities with the molten resin as the die wheel rotates in one direction; continuously molding a multiplicity of coupling elements integrally on the front surface of a continuous board-shaped base layer as the die wheel is rotated; applying a porous backing material to the base layer under pressure while the base layer is moved in response to the rotation of the die wheel; cooling the die wheel to a predetermined temperature; and positively pulling the base layer with the backing material attached thereto as cooled, from the die wheel as the molded coupling elements of the engaging section are removed off the coupling element molding cavities.

10 Claims, 3 Drawing Sheets

FIG. I

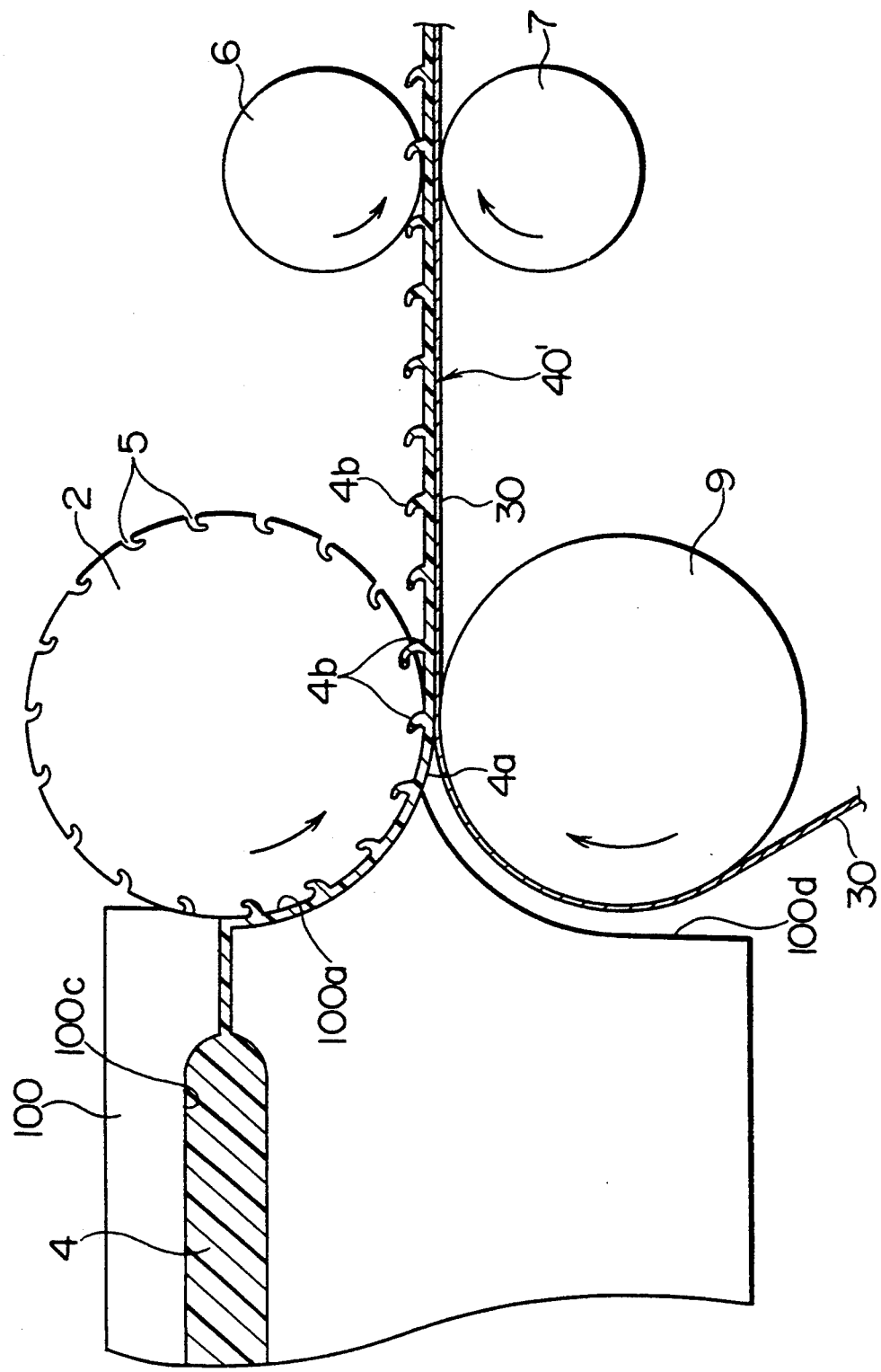

METHOD AND APPARATUS FOR MANUFACTURING A MATERIAL-BACKED ENGAGING MEMBER FOR SURFACE FASTENER

BACKGROUND OF THE INVENTION

1. Field of the Invention

The present invention relates to a method and apparatus for manufacturing a continuous length of molded surface fastener from a continuously ejected board-shaped base layer of thermoplastic resin on the front surface of which a plurality of coupling elements are formed and to the back surface of which a backing material is attached, and more particularly to a method and apparatus for manufacturing a molded surface fastener where the backing material is attached in a firm and efficient manner so as to give this invention a wide variety of applications.

2. Description of the Related Art

Surface fasteners which have coupling elements on both the front and the back of their base layers are disclosed in, for example, Japanese Patent Publication No. Sho 42-87459 and Japanese Utility Model Laid-Open Publication No. Sho 55-122612. In the double-sided surface fastener disclosed in Japanese Patent Publication No. Sho 42-87459, multifilament loops are woven into one side of a single sheet of woven fabric and monofilament loops are woven into the other side. After both sides have been heat set, each of the monofilament loops is cut partially off to form hook shapes so as the woven fabric will then have loops on one side and hooks on the other side. Resin is then applied to the base fabric to hold the hooks and loops in place.

In the double-sided surface fastener disclosed in Japanese Utility Model Laid-Open Publication No. Sho 55-122612, soft tape having fiber loops on one side and fiber hooks on the other side is used. However, it is not made clear in this publication exactly how the hooks and loops are fixed to the structure of the soft tape. As fiber is used for the coupling elements for the double-sided surface fastener in this publication also, it is assumed that either the same woven structure as was disclosed in the above Japanese Patent Publication No. Sho 42-87459, or a structure where individual fibers are planted in a flexible sheet was used.

On the other hand, in Japanese Patent Publication No. Hei 1-238805 a surface fastener is disclosed in which the base material and the coupling elements are molded from synthetic resin. Here, in order to make a double-sided surface fastener, a large number of rows of protruding mushroom shaped coupling elements are formed on the front surface of the base layer from the same material as the base layer, as is shown in FIG. 18 of the same publication. A large number of rows of protruding coupling elements with spherical heads are also formed on the back side as is shown in the same figures. The theory of the structure of the double-sided surface fastener in this publication is as follows. As becomes clear from the above specification, these surface fasteners can be formed by putting thin tapes having large numbers of coupling elements formed in row on them onto both sides of a common base material of sufficient width to form a surface fastener. Alternatively, these thin tapes could simply be stuck together with adhesive or adhesive resin to form a surface fastener of fixed width.

When manufacturing the surface fastener disclosed in Japanese Patent Publication No Hei. 1-238805, thin tape having a large number of protruding coupling elements along its length is either injection or press molded in a continuous or non-continuous manner. The necessary number of tapes are then placed side by side and then glued together by using, for example, an adhesive.

A further surface fastener is disclosed in Japanese Utility Model Laid-Open Publication No. Hei. 55-55602. Here, a fiber backing material which is, for example, a knitted or woven article, non-woven cloth or paper is fused onto the back surface of a surface fastener molded from synthetic resin which has a base layer with a large number of hooks formed in it.

In the same publication, the fiber backing material is pushed with a great deal of force against the molded body while the resin from which it is made is still molten and in this way a surface fastener is formed. However, the details of this manufacturing process are not disclosed.

With the fabric type of surface fastener disclosed in Japanese Patent Publication No. Sho. 42-87459, the combination of the degree of softness usually associated with fabrics and the softness of monofilaments means that the loops and hooks can be brought together and peeled away from each other in a very smooth manner. Furthermore, by putting the monofilaments which are to be made into hooks through a drawing process, even with just a small area of cut through surfaces a high degree of coupling strength and flexibility can be attained. Also, by increasing the hook density, it is possible to increase the coupling strength and make the item sufficiently durable when used repeatedly. It is, however, very difficult to reduce the production costs with this fabric type of surface fastener as this process consumes a large amount of material and requires a large number of manufacturing steps.

Also, as is made clear in the aforementioned publication, this kind of surface fastener where coupling elements are woven into both sides of a fabric type base differs from other common fabric type surface fasteners with coupling elements on their surfaces in that it is impossible to impregnate resin only into the base fabric when it is intended to hold the roots of the coupling elements protruding from both sides of the base fabric in place. Unfortunately, this resin cannot be restricted to just the fase fabric and unavoidably adheres to the coupling elements. It is therefore very difficult to fix them in a secure manner without making the coupling elements tough.

Also, it becomes clear from the publication that a very complicated manufacturing process is required to produce the kind of integrally molded type surface fastener which is disclosed in Japanese Patent Publication No. Hei 1-238805. This means that this kind of double-sided surface fastener cannot be produced efficiently and it becomes apparent from FIG. 18 in the same publication that a high level of productivity is nearly impossible.

In the aforementioned Japanese Utility Model Laid-Open Publication No. Hei 55-55602 a material backed surface fastener is also forwarded. Here, the fiber backing material is pushed with a great deal of force against the molded body while the resin from which it is made is still molten. Since there is a great temperature differential between the backing material and the molded body, the molten resin solidifies as soon as it comes in contact with the fiber material irrespective to their welding performance, so that the two items cannot be

SUMMARY OF THE INVENTION

Since this invention sets out to solve the problems encountered in conventional double-sided surface fasteners, its object is to provide a method and apparatus for manufacturing a molded surface fastener where a backing material such as a knitted or woven article, a non-woven cloth, a piece of paper or a sheet of synthetic resin is attached to the back surface of an integrally molded synthetic resin engaging member in a firm and efficient manner.

As the result of a great deal of research into how best to achieve the aims of this invention, it has been found that in order to ensure that the backing material is fixed firmly to the back surface of the molded base layer with coupling elements, it is important that this backing material has at least a large number of holes or interstices and is heated before being applied to the base layer. To this end, using the surface fastener extruding nozzle in high temperature as a heating source for the backing material proves to be both economically viable and satisfactory from the point of view of productivity.

Technology for molding a base layer and coupling elements which are integrally formed on this base layer's front surface at the same time are published in, for example, Japanese Patent Publication No. 49-29697, U.S. Pat. No. 3312583 and International Patent Laid-Open Publication No. 1-501775.

For example, in the molding method disclosed in the above U.S. Pat. No. 3312583, molten thermoplastic resin is pressed against the outer surface of a rotating drum made up from a plurality of circular metallic plates with corresponding plate shaped spacers. After this resin has gone into hook molding cavities formed in the circular metallic plates, pressure is applied to the resin which has been spread all over the surface of the drum to form a base layer. The hooks formed within the hook shaped cavities are then pulled away from the surface of the drum along with the base layer in accordance with the rotation of the drum. There is a plurality of hook molding cavities formed at fixed intervals in the outer surface of these circular metallic plates so as to point inwards towards the center of these plates but the outer surface of the plate shaped spacers is flat. The reason why these plate shaped spacers are necessary is that because of the hook shape, the cavities for the whole hook structure cannot be defined by a single mold.

This inventive concept has come about as the result of a great deal of research. It is intended to expand upon and fully consider the synthetic resin molded surface fastener technology disclosed in the above publications to meet the the mentioned demands.

According to a first aspect of the invention, there is provided a method of manufacturing a continuous length of surface-fastener engaging member including a base layer on the front surface of which a multiplicity of coupling elements are molded and on the back surface of which a backing material is attached, comprising the steps of: extruding from an extrusion nozzle a predetermined width of molten resin; introducing the molten resin, which is extruded from the extrusion nozzle, into a predetermined gap between the extrusion nozzle and a die wheel, which has a multiplicity of coupling element molding cavities on its circumferential surface and a cooling unit inside, to fill up the coupling element molding cavities with the molten resin as the die wheel rotates in one direction; continuously molding a multiplicity of coupling elements integrally on the front surface of a continuous board-shaped base layer as the die wheel is rotated in such a direction as to extrude the molten resin; applying a porous backing material, which is supplied separately from the molten resin and adjacently to the extrusion nozzle while being heated, to the board-shaped base layer under pressure while the board-shaped base layer is moved in response to the rotation of the die wheel; cooling the die wheel to a predetermined temperature; and positively pulling a resulting engaging member, which includes the board-shaped base layer with the backing material attached thereto as cooled, from the die wheel in the molten resin extruding direction as the molded coupling elements of the engaging member are removed off the coupling element molding cavities.

As becomes clear from the method described above, the double-sided molded surface fastener for this invention can be produced using just one simple, continuous manufacturing process. This means that the uniformity and productivity for the product can be improved while at the same time the price can be reduced.

According to a second aspect of the invention, there is provided an apparatus for manufacturing a continuous length of surface fastener engaging member including a base layer on the front surface of which a multiplicity of coupling elements are molded and on the back surface of which a backing material is attached, comprising: a die wheel having a multiplicity of coupling element molding cavities on its circumferential surface and a built-in cooling means; a drive means for rotating the die wheel in one direction; an extrusion nozzle situated adjacent to and confronting the die wheel, the extrusion nozzle having inside an extrusion flow channel through which a predetermined width of molten resin is to be extruded, the extrusion nozzle having a back material guide means for guiding a backing material, which is supplied separately from the molten resin, in contact with the molten resin; and coacting puller rollers situated downstream of the die wheel in its rotating direction.

In an apparatus for manufacturing a molded surface fastener of the second aspect of the invention, the conventional molding theory is employed along with an apparatus having a simple construction. At the same time, the initial objectives of producing a continuous length of high quality surface fastener in an efficient manner can still be achieved.

In the integrally molded product obtained according to this manufacturing method, a backing material made of, for example, a knitted or woven article, non-woven cloth or paper, a porous foam resin or porous synthetic resin sheet having a large number of loops or hooks formed on its front side is attached to the rear side of a base layer which has a large number of coupling elements on its front side. As the backing cloth is heated by the extruding nozzle, this base layer material is impregnated into the porous backing material so that it performs anchoring function to connect them firmly. The backing material and the base layer are then firmly pressed together while the resin is still molten and the two items are firmly joined together. At this point, part of the molten base layer is impregnated into this backing material without being cooled to adhere with the backing material and the two items are then gradually cooled to become one item.

BRIEF DESCRIPTION OF THE DRAWINGS

FIG. 3 is a longitudinal cross-sectional view of the essential parts of a means for manufacturing an integrally molded engaging member with backing material attached for a thrid embodiment of the present invention.

DETAILED DESCRIPTION

First Embodiment

The following is a detailed explanation based on the diagrams of a first embodiment of this invention.

Figure 1:
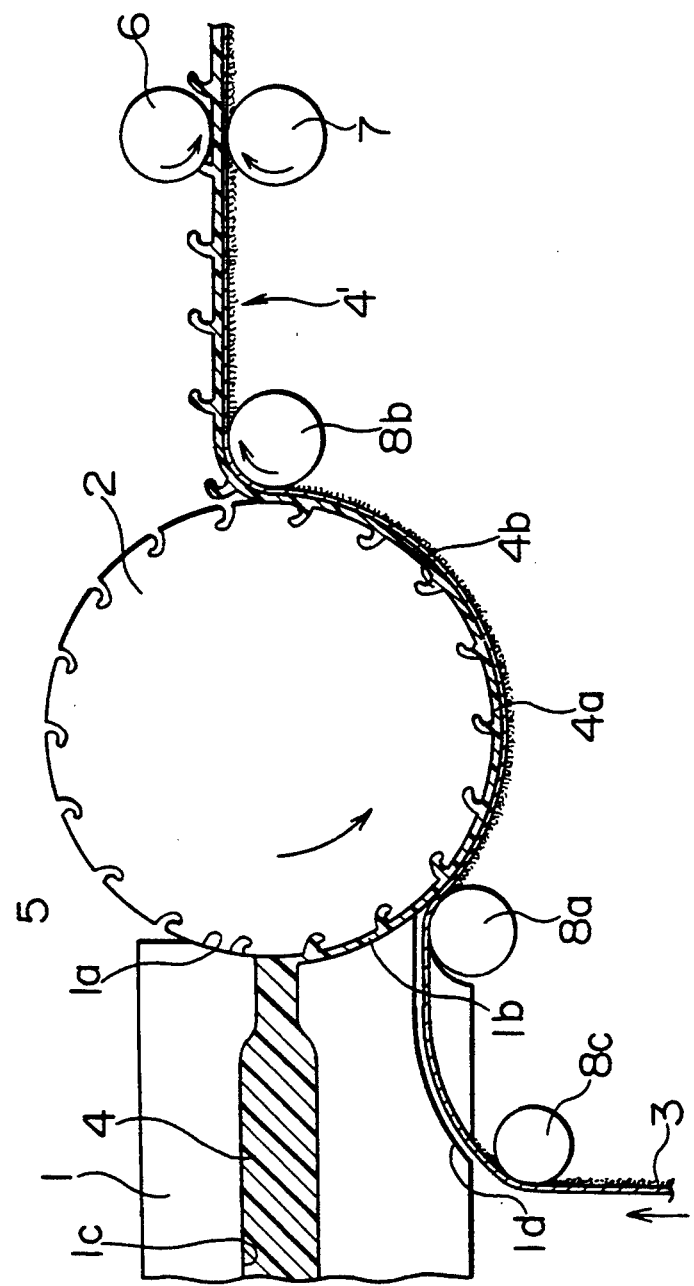
FIG. 1 is a longitudinal cross-sectional view of the essential parts of a means for manufacturing a integrally molded engaging member with backing material attached for a first embodiment of the present invention.

FIG. 1 is a vertical cutaway view showing the essential parts of the construction of a means for attaching a knitted or woven backing material which has loops as coupling elements on its front surface to a base material which has hooks as coupling elements on its front surface for a first embodiment of this invention.

Also in FIG. 1, numeral 1 indicates an extrusion nozzle 1. At the front end surface of the upper half of the nozzle 1 there is an upper arced surface 1a, the curve of which mirrors that of the die wheel 2 to be described later, while at the front end surface of the lower half of the nozzle 1 there is a further lower arced surface 1b, the curve of which also mirrors that of the die wheel 2 but which is spaced a fixed distance away from the die wheel 2. This extrusion nozzle 1 is formed into a T-shaped die and has a molten resin flow path 1c at its center from which sheets of molten resin are extruded in a manner according to the present invention.

A backing material guide channel 1d is formed in the lower half of the extrution nozzle 1. Its entrance is in the lower wall of the lower half of the extrusion nozzle 1 and it then curves around until it runs parallel with the molten resin flow path 1c before exiting via the lower arced surface 1b in the vicinity of the die wheel 2 and a rear pressure roller 8a which is spaced at a fixed distance from the die wheel 2. This rear pressure roller 8a also applies pressure between the sheet of molten resin extruded from the extrusion nozzle 1, a backing material 3 to be attached to this sheet which will be described later, and the die wheel The die wheel 2 is arranged so that its axis would be parallel with the outlet of the molten resin flow path 1c. The upper arced surface 1a will then make contact with part of the outer circumference of the die wheel 2 and the lower arced surface 1b will be spaced a fixed distance from this die wheel 2. According to the example in FIG. 1, there is also a plurality of hook molding cavities 5 formed in the outer surface of the die wheel 2.

Herein, only a brief description of the construction of the die wheel 2 will be given as its construction is essentially the same as that in Japanese Patent Publication No. Hei. 1-501775. The die wheel 2 includes a hollow drum with a water-cooling jacket. A multiplicity of ring-shaped boards are fixedly laminated centrally and axially in the hollow drum. Each of every other ring-shaped boards has a multiplicity of cavities 5 on opposite side peripheral surfaces, each cavity opening at its root end to the side peripheral surface, while each ring-shaped board adjacent to the cavitied ring-shaped boards is flat at opposite side surfaces.

The die wheel 2 is then rotated in the direction indicated by the arrow inside the die wheel in the diagram using a known fixed speed driving means. There is then a front guide roller 8b at the front of the guide wheel 2 (the right hand side in the diagram) which simultaneously rotates at the same speed as the die wheel 2 and is followd by a pair of puller rollers 6 and 7.

Any one of thermoplastic resins such as nylon, polyester or polypropylene can be used as the resin material and also as the backing material in this invention. This means that the front material and the backing material can either be made of the same material or different materials. When molding, the temperature of the molten resin, the extruding pressure, the die hole temperature and the speed of rotation will all then be adjusted according to the resin used. It is, however, important that the temperature at which the synthetic resin selected for the front material becomes molten is lower than that for the resin material used for the backing material, as the backing material guide channel 1d is formed within the extrution nozzle 1 in this first embodiment.

According to the means for this invention described above, the molten resin extruded from the extrusion nozzle 1 will be forced into the gap between the die wheel 2 and the lower arced surface 1b. It will therefore also fill up the hook molding cavities 5 so that hooks 4b along with a board shaped base layer 4a of fixed thickness and width will be sequentially press molded.

At the same time as this molding process is taking place, the backing material 3 is guided up through the backing material guide channel 1d in the extrusion nozzle 1 via the guide roller 8c and is heated by this extrusion nozzle 1. When it exits from this backing material guide channel 1d it will be pressed against the surface of the molten base layer 4a by the rear pressure roller 8a.

When this pressure is applied, some of the molten resin 4 from the base layer 4a intrudes into the knitted or woven structure of the backing material 3 deeply as the temperature differential between the two surfaces is small. This not only means that the base layer 4a and the backing material 3 are firmly joined together, but also means that the bases of the loops in the backing material are firmly held by the resin so that the loops will hold their shape well and will be very durable.

The molten resin 4 which is in contact with approximately half of the die wheel 2 then gradually begins to solidify as it is guided around by the front guide roller 8b. During this time the backing material 3 and the molten resin 4 are both cooled from the inside of the die wheel 2 and gradually bond together to become one item. The hooks 4b are then tugged using a suitable degree of force smoothly out of the cavities 5 before the molten resin has completely solidified so as the hooks can be temporarily deformed in the process, but can still restore themselves to their original shape before solidifying completely.

In this embodiment a pair of puller rollers 6 and 7 which are turning in opposite directions with respect to each other at the same speed are then used to pull the molded resin product 4' (i.e. material backed surface fastener) out from the die wheel 2 after it has been molded. Here, the outer surfaces of the puller rollers 6 and 7 are smooth but any kind of surface which will pull out the hooks without damaging them will also be suitable. It is also advisable to have the puller rollers 6 and 7 rotating at a slightly faster speed than that of the die wheel 2 to ensure that the hooks 4b are pulled smoothly from their hook molding cavities 5.

Second Embodiment

Figure 2:
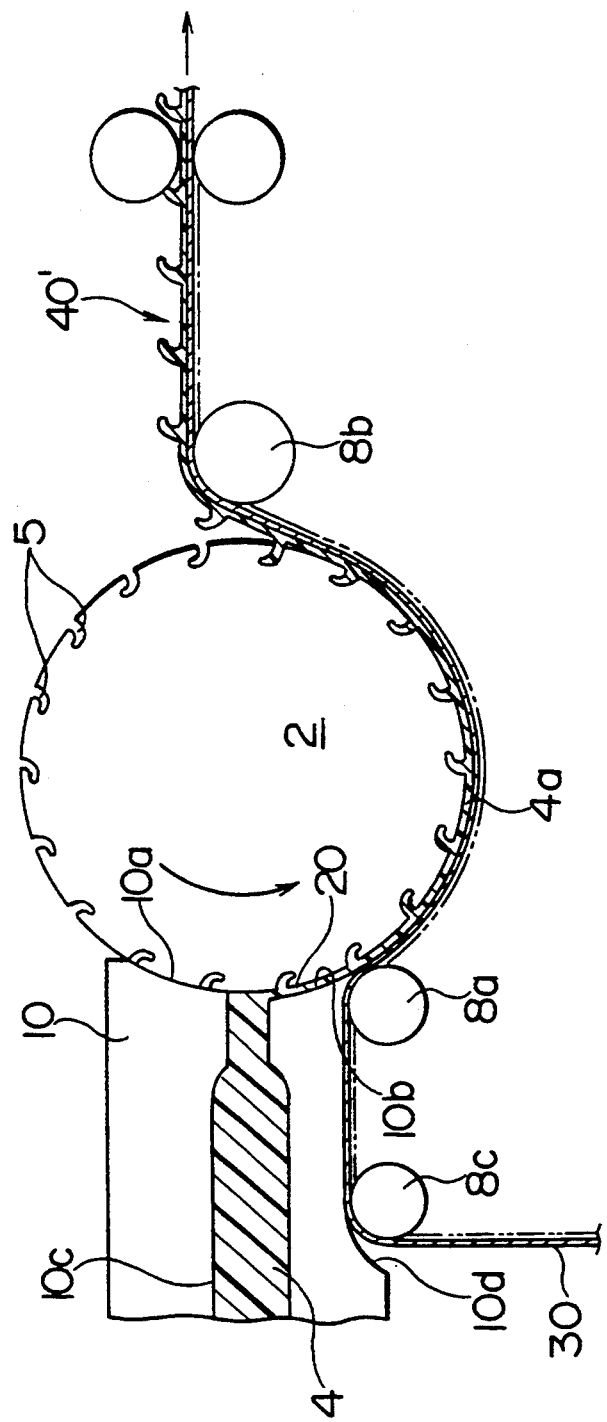
FIG. 2 is a longitudinal cross-sectional view of the essential parts of a means for manufacturing an integrally molded engaging member with backing material attached for a second embodiment of the present invention.

FIG. 2 is a view of a means of constructing a material backed engaging member for a second embodiment of the present invention. Here, the backing material guide channel 1d is formed outside the nozzle 1. Items in this second embodiment which are essentially the same as items described in the first embodiment will be labelled using the same numerals.

In FIG. 1, numeral 10 represents an ejector nozzle. The upper half of this ejector nozzle 10 has an upper arced surface 10a at its front end, the curvature of which mirrors that of the die wheel 2 which is placed centrally at the front of the nozzle 10. There is then a lower arced surface 10b at the front end of the lower half of the nozzle the curvature of which also mirrors that of the die wheel 2, with this lower surface being spaced a fixed distance away from the die wheel 2. The extrusion nozzle 10 includes a T-shaped die having a molten resin flow path 10c which opens where the upper and lower arced surfaces 10a and 10b meet, from which a sheet of molten resin 4 is extruded.

There is also a backing cloth guide surface 10d for a backing material 30 at the lower surface of the extrusion nozzle 10. A guide roller 8c and a rear pressure roller 8a are then positioned a fixed distance apart from each other at the back and front of this backing material guide surface 10d (left and right in the diagram respectively). The guide roll 8c serves to guide the backing material 30 along the backing material guide surface 10d and the rear pressure roller 8a has the same function as that described in the first embodiment.

In this second embodiment, knitted or woven articles, non-woven cloth or porous film can be used as the backing material. After the molding process, the backing material and the front material will be firmly molded together as with the first embodiment.

When the apparatus are constructed for this second embodiment according to the manner described above, molten resin 4 is extruded from the extrusion nozzle 10 into a gap 20 between the nozzle 10 and the die wheel 2. The molten resin 4 then flows into the hook molding cavities 5 at the circumference of the die wheel 2 and is then gradually molded as the die wheel 2 rotates about almost half of its circumference. At the same time as this molding process is taking place, the backing material 30 is guided up along the backing material guide surface 10d by the guide roller 8c and the rear pressure roller 8a while being heated by the nozzle 10. It is then pressed against the molten surface of the base layer 4a by the rear pressure roller 8a upon leaving the backing material guide surface 10d.

When this pressure is applied, some of the molten resin 4 from the base layer 4a intrudes into a plurality of interstices present within the backing material 30 because the temperature differential between the two surfaces is small. In this way, the base layer 4a and the backing material 30 are firmly joined together.

During this time the backing material 30 and the molten resin 4 are cooled from both the inside of the die wheel 2 and by external air so that they gradually bond firmly together to become one item. While this bonding process is taking place, the item is guided by the front guide roller 8b, and thus the firmly bonded product eventually is pulled out by the puller rollers 6 and 7.

Third embodiment

FIG. 3 is a view of a third embodiment of the present invention. In this embodiment, in addition to the die wheel 2, a further guide-pressure wheel 9 for the backing material 30 having the same external diameter as the die wheel 2 is arranged directly below the die wheel 2. The die wheel 2 and the guide pressure wheel 9 are driven at the same speed in opposite directions and are placed in the vicinity of the upper arced surface 100a and the lower arced guide surface 100d, respectively, at the front end of an extrusion nozzle 100. The lower arced guide surface 100d constitutes one part of a backing material guide path for this invention. A sheet of molten resin is extruded at the guide wheel 2 from the extrusion nozzle 100 in the same manner as that for the embodiments described previously. The backing material 3 or 30 is then provided from below via the guide pressure wheel 9 and is heated by the nozzle 100 as the drum rotates through 120 degrees in order to pass the backing material 30 through the backing material guide path formed between the guide pressure wheel 9 and the lower arced guide surface 100d. The molten resin 4 and the backing material 30 then come from opposite directions to pass together between the die wheel 2 and the guide pressure wheel 9. At this time both wheels apply pressure to the materials to bond them into one item before this one item is positively pulled out by puller rollers 6 and 7.

As was the case for the other embodiments mentioned previously, some of the molten resin 4 from the base layer 4a intrudes into a plurality of interstices present within the backing material 30 and then solidifies so that the molded resin product 40' and the backing material 30 are firmly joined together to form one item.

When a molded resin product 4' or 40' is manufactured in a manner according to any of the embodiments described previously, it will be formed as a single body having a plurality of hooks integrally formed on its base layer 4 with a backing material 3 or 30 fixed firmly to its rear side. Although this is not shown in the examples in the diagrams, these hooks will be arranged in a plurality of rows with the hooks in each row facing in the opposite direction to the hooks in the neighboring row. In this way, the resulting surface fastener will have a coupling strength which is non-directional.

Although a hook shaped coupling element is used as the coupling element formed on the front surface of the base layer in embodiments 1 to 3, this invention is by no means limited to this kind of hook shape and shapes such as mushroom shape or approximate V-shape with anchoring function would also be suitable. Also, the rear surface is not just limited to a flat surface or a surface with a plurality of loops rising up from it and it may have coupling elements of mushroom shape or approximate V-shape. For example, a molded product having coupling elements of anchor shape on its rear surface and molded coupling elements of hook shape rising up from its resin surface could be used to secure a carpet to a floor covering. The hooks of the molded product would engage with the loops of the carpet and the anchors would then anchor themselves into the floor covering to effectively anchor the carpet to the floor covering. In this way, the carpet could then be spread all over the floor.

In each of the above embodiments, a sheet of molten resin is extruded via a single molten resin flow path before being pressed together against the backing material to form a single item. However, depending on the properties of the materials, there are also cases where it is necessary to use an adhesive. It is then necessary to dispose a further resin flow path inbetween the first molten resin flow path and the backing material guide path. A second molten resin which has affinity with both the first molten resin and the backing material is then extruded from this second resin flow path. This second resin will be sandwiched between the front and back materials thus improving performance of fusing the molded product and the backing material.

This invention should by no means be limited to the foregoing examples, and various modifications may be suggested without departing from the spirits of this invention.

A large number of complicated manufacturing processes are not necessary for the method according to the present invention described in detail previously. Instead, a backing material having a large number of coupling elements on its surface is firmly secured to an integrally molded type engaging member in one simple sequential manufacturing process. Partly because of the simple structure of the apparatus for this invention and partly because of its superior operativity, the production yield for this type of coupling section with backing material attached is extremely high.

With the type of engaging member with backing material attached which has been attained, the molten resin flows from the base layer portion of the engaging member into the plurality of interstices present within the structure of the backing material and solidifies, the anchoring effect of which firmly bonds the items together. This will prevent cracks appearing in the engaging member when it is sewn and will also prevent both items from peeling away from each other. More particularly, for the case of a surface fastener where the backing material is knitted or woven having hooks or loops, resin from the integrally molded base layer will impregnate the base cloth. This resin will then firmly hold the bases of the hooks or loops which will prevent the hooks or loops from falling off or changing shape and will thus greatly enhance the durability of the item.

What is claimed is:

1. A method of manufacturing a continuous length of surface fastener engaging member including a base layer on the front surface of which a multiplicity of coupling elements are molded and on the back surface of which a backing material is attached, comprising the steps of:
   (a) extruding from an extrusion nozzle a width of molten resin;
   (b) introducing the molten resin, which is extruded from the extrusion nozzle, into a gap between the extrusion nozzle and a die wheel, said gap having a constant depth extending around a partial circumference of said die wheel, which has a multiplicity of coupling element molding cavities on its circumferential surface and a cooling unit inside, to fill up the coupling element molding cavities with the molten resin as the die wheel rotates in one direction;
   (c) continuously molding a multiplicity of coupling elements integrally on the front surface of a continuous board-shaped base layer as the die wheel is rotated in such a direction as to extrude the molten resin;
   (d) applying a porous backing material, which is supplied separately from the molten resin and adjacently to the extrusion nozzle while being heated, to the board-shaped base layer under pressure while the board-shaped base layer is moved in response to the rotation of the die wheel;
   (e) cooling the die wheel to a predetermined temperature; and
   (f) positively pulling a resulting engaging member, which includes the board-shaped base layer with the backing material attached thereto as cooled, from the die wheel in the molten resin extruding direction as the molded coupling elements of the engaging member are removed off the coupling element molding cavities.

2. A surface-fastener engaging member manufacturing method according to claim 1, wherein the step of applying a porous backing material, which is supplied separately from the molten resin and adjacently to the extrusion nozzle while being heated, is further defined by guiding the backing material between a guide surface on the extrusion nozzle and a pressure portion facing the die wheel.

3. A surface fastener engaging member manufacturing method according to claim 1, wherein the step of applying a porous backing material, which is supplied separately from the molten resin and adjacently to the extrusion nozzle while being heated, is further defined by guiding the backing material within a backing material guide channel extending in the extrusion nozzle.

4. A surface fastener engaging member manufacturing method according to claim 1, wherein each of the coupling elements molded on the board-shaped base layer has a hook shape.

5. A surface fastener engaging member manufacturing method according to claim 2, wherein each of the coupling elements molded on the board-shaped base layer has a hook shape.

6. A surface fastener engaging member manufacturing method according to claim 3, wherein each of the coupling elements molded on the board-shaped base layer has a hook shape.

7. A surface fastener engaging member manufacturing method according to claim 1, wherein the porous backing material is a knitted, woven, or non-woven cloth having on one surface a multiplicity of loops.

8. An apparatus for manufacturing a continuous length of surface fastener engaging member including a base layer on the front surface of which a multiplicity of coupling elements are molded and on the back surface of which a backing material is attached, comprising:
   (a) a die wheel having a multiplicity of coupling element molding cavities on its circumferential surface and a built-in cooling means;
   (b) a drive means for rotating said die wheel in one direction;
   (d) an extrusion nozzle situated adjacent to and confronting said die wheel, said extrusion nozzle having inside an extrusion flow channel through which a width of molten resin is to be extruded, said extrusion nozzle shaped to provide a substantially constant depth gap around a partial circumference of said die wheel, said gap open to said flow channel, said extrusion nozzle having a backing material guide means for guiding a backing material, which is supplied separately from the molten resin, in contact with the molten resin; and
   (e) coacting puller rollers situated downstream of said die wheel in its rotating direction.

9. A surface-fastener engaging member manufacturing apparatus according to claim 8, wherein said backing material guide means is a guide channel defined by a nozzle surface and a guide and pressure portion of said extrusion nozzle.

10. A surface-fastener member manufacturing apparatus according to claim 8, wherein said backing material guide means is a guide channel formed within said extrusion nozzle.

* * * * *